(12) United States Patent
Kassner et al.

(10) Patent No.: US 11,225,263 B2
(45) Date of Patent: Jan. 18, 2022

(54) DRIVER ASSISTANCE SYSTEM

(71) Applicant: Volkswagen AG, Wolfsburg (DE)

(72) Inventors: Astrid Kassner, Berlin (DE); Jacqueline Cullmann, Braunschweig (DE); Nils Kötter, Braunschweig (DE)

(73) Assignee: Volkswagen AG

( * ) Notice: Subject to any disclaimer, the term of this patent is extended or adjusted under 35 U.S.C. 154(b) by 33 days.

(21) Appl. No.: 15/851,031

(22) Filed: Dec. 21, 2017

(65) Prior Publication Data
US 2018/0178812 A1 Jun. 28, 2018

(30) Foreign Application Priority Data
Dec. 27, 2016 (EP) .................................. 16206959

(51) Int. Cl.
| | | |
|---|---|---|
| *G07C 5/08* | (2006.01) | |
| *B60R 1/00* | (2006.01) | |
| *B60W 50/10* | (2012.01) | |
| *G06F 3/01* | (2006.01) | |
| *G06K 9/00* | (2006.01) | |
| *B60W 50/14* | (2020.01) | |
| *G01C 21/36* | (2006.01) | |
| *G06T 19/00* | (2011.01) | |

(52) U.S. Cl.
CPC ........... *B60W 50/14* (2013.01); *G01C 21/365* (2013.01); *G01C 21/3679* (2013.01); *G06K 9/00671* (2013.01); *G06K 9/00791* (2013.01); *G06T 19/006* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 9,310,218 B2 | 4/2016 | Choi | |
| 9,725,097 B2 | 8/2017 | Oguri | |
| 2011/0052042 A1* | 3/2011 | Ben Tzvi | G06T 19/006 |
| | | | 382/154 |
| 2014/0019005 A1* | 1/2014 | Lee | G08G 1/0962 |
| | | | 701/36 |
| 2015/0032330 A1* | 1/2015 | Sakoda | G06F 3/167 |
| | | | 701/36 |
| 2015/0138087 A1 | 5/2015 | Kim et al. | |

(Continued)

FOREIGN PATENT DOCUMENTS

| | | |
|---|---|---|
| CN | 103052977 A | 4/2013 |
| CN | 105459824 A | 4/2016 |

(Continued)

OTHER PUBLICATIONS

Office Action for Korean Patent Application No. 10-2017-0177896; dated Oct. 22, 2019.

(Continued)

*Primary Examiner* — Adam D Tissot
*Assistant Examiner* — Laura E Linhardt
(74) *Attorney, Agent, or Firm* — Barnes & Thornburg LLP

(57) ABSTRACT

A driver assistance system, a computer program product, a signal sequence, a vehicle and a method for providing information to a user of a vehicle are provided in this disclosure. In particular, the present disclosure relates to an intuitively comprehensible announcement associated with a point of interest (POI) for the user.

20 Claims, 2 Drawing Sheets

(56) References Cited

U.S. PATENT DOCUMENTS

2016/0379422 A1* 12/2016 Kahn ..................... B60K 35/00
                           701/36
2018/0157037 A1* 6/2018 Kasazumi .......... G02B 27/0101

FOREIGN PATENT DOCUMENTS

| | | | |
|---|---|---|---|
| CN | 105596641 A | 5/2016 |
| DE | 102011082606 A1 | 3/2013 |
| DE | 102013016249 A1 | 6/2014 |
| DE | 102013016244 A1 | 4/2015 |
| EP | 2793193 A1 | 10/2014 |
| EP | 2899506 A1 | 7/2015 |
| EP | 2919057 A1 | 9/2015 |
| KR | 20060078812 A | 7/2006 |
| KR | 20130104821 A | 9/2013 |
| KR | 20150033096 A | 4/2015 |
| KR | 20150056234 A | 5/2015 |
| WO | 2013080283 A1 | 4/2015 |

OTHER PUBLICATIONS

Office Action for Chinese Patent Application No. 201711442205.5; dated Aug. 27, 2020.
Office Action for Korean Patent Application No. 10-2017-0177896; dated Apr. 2, 2019.
Office Action for Chinese Patent Application No. 201711442205.5; dated Apr. 21, 2021.

* cited by examiner

DRIVER ASSISTANCE SYSTEM

CROSS REFERENCE TO RELATED APPLICATIONS

This application claims priority to and the benefit of European Patent Application Number 16206949.5, filed 27 Dec. 2017, the disclosure of which is now expressly incorporated herein by reference.

FIELD OF THE DISCLOSURE

The present disclosure relates to a driver assistance system, a computer program product, a signal sequence, a vehicle and a method for providing information to a user of a vehicle. In particular, the present disclosure relates to intuitively comprehensible announcement, which is therefore in need of little interpretation, of a point of interest (POI) for the user.

BACKGROUND

Numerous pieces of information relevant to a journey, such as POIs, may be displayed in the navigation map in a head down display and/or reproduced using an address on a screen. Besides aversion of his eyes from the road, this can require the driver to orient himself in the map and to transfer this orientation to the real environment or, when the address is displayed, can require him to look for the address in the environment using road signs and house numbers. It is an object of the present disclosure to provide better interpretability and greater convenience for reading/recording information with regard to POIs in the surroundings of a vehicle.

SUMMARY

The present disclosure teaches a method for providing information to a user of a vehicle. The user may be a driver, front-seat passenger or passenger of the vehicle, for example. The vehicle may be an automobile, transporter, truck, motorcycle, aircraft and/or watercraft, for example. In a first step, a point of interest (POI) is ascertained. This can be accomplished by virtue of its coming within a predefined distance of the vehicle. Optionally, the user may also desire particular categories of POI to be displayed in a manner according to the present disclosure. Subsequently, advice, situated virtually in a plane of the road surface, of the proximity to the POI is output to the user. This is effected by means of a display device included in the vehicle. The display device may be a visual display device. In particular, the display device can comprise a heads up display. The advice may be at a virtual, fixed distance from the vehicle. In other words, the vehicle "pushes" the advice ahead of it on the road surface. Aversion of one's eyes to a central information display, a combination instrument or another head down display is therefore no longer required. The driver is provided with advice of the current proximity to the POI while his eyes remain on what is happening on the road. In this manner, the potential for distraction when a POI is displayed can be reduced and road safety in a correspondingly configured vehicle can be increased.

In illustrative embodiments, the advice can comprise an icon, for example. The icon may be arranged in a circular symbol that can have a perspective distortion on account of its being situated virtually in the road surface plane. In this manner, the advice of the POI can be highly recognizable, although the category of the POI is intuitively discernible from the icon.

In illustrative embodiments, a current speed of travel of the vehicle can be ascertained (e.g. from a bus of the onboard information system) and the manner in which the advice is depicted can be varied on the basis of the speed of travel. By way of example, the speed of travel can be taken as a basis for increasing a distance or a period of time before the POI is reached up to when it is driven through or passed, over which distance or period of time the POI is constantly displayed in an inventive manner. The user is therefore left with sufficient time/distance to initiate a maneuver in the event that he wishes to drive to the POI.

A further indication of the position of the POI can be provided by a pointer in the region of the advice that, starting from the advice/from the vehicle, points in the direction of the real position of the POI. The pointer may be configured as a circular arc segment, for example, that wraps around a circle that surrounds the icon of the advice anyway. The circular arc segment may be arranged, in accordance with an arrow head, at that position of the advice that is visually closest to the POI. As an alternative or in addition to the circular arc segment, the outline/the circle of the advice can have a teardrop shape, with the tapered section of the teardrop pointing in the direction of the POI. Various configurations arise in this case, which are discussed below.

The length of the pointer can be adjusted on the basis of a distance of the vehicle from the POI. By way of example, the length of the pointer can denote a maximum distance to the center of the advice. The greater the distance to the POI, the longer or shorter the pointer may be. In other words, the pointer can stretch out in the direction of the POI when the latter comes closer or moves away from the vehicle.

A similar variation in the advice can result from the change in a color (at least of part) of the advice on the basis of a distance of the vehicle from the POI. In this manner, the user can be provided with an additional/alternative orientation in relation to the relative position of the POI with regard to the vehicle without having to interpret a numerical value and/or advice in text form. Particularly for car rental companies, this can be an advantage, since their customers come from a large number of different language areas.

To preserve clarity for the display according to the present disclosure, there may be provision for, upward of a predefined number of pieces of advice to be output for POIs, the icons for the individual facilities to be collected within a joint circular symbol. This can make sense particularly when the POIs are at a similar distance and/or in a similar direction with regard to the vehicle. In this manner, a direction statement and/or a distance statement with regard to the POIs represented in the advice are also substantially identical. Such combination may make sense when announcing freeway service areas, for example, at which a multiplicity of goods and services are usually provided that can be announced particularly intuitively by respective icons. As soon as the vehicle has come close enough to the multiplicity of POIs for the individual POIs to be situated in sufficiently different directions and/or at sufficiently different distances, the joint advice that has been output hitherto can "break down" into individual pieces of advice, with respective directions and distances being represented by a respective pointer of the respective advice. The same can occur in the converse case in which the vehicle moves away from the accumulation of different POIs and combination of the pieces of advice regarding direction and distance does not entail an inappropriate superfluity of information.

According to a second aspect of the present disclosure, a driver assistance system for providing information to a user of a vehicle is proposed. The system comprises a data input (e.g. an antenna, a bus system or the like), an evaluation unit (an electronic controller, a programmable processor, a microcontroller or the like) and a data output (a display device, a bus system, a head up display or the like). The evaluation unit is set up to use the data input to ascertain a point of interest (POI). By means of the data output, the evaluation unit is set up to output advice, situated virtually in a plane of the road surface, at the proximity of the vehicle to POIs to the user. This is effected by means of a display device of the vehicle, which display device is linked to the data output for information interchange purposes. In this manner, features, combinations of the features and advantages of the driver assistance system according to the present disclosure are so obvious in accordance with those of the method according to the present disclosure that reference is made to the explanations above to avoid repetition.

According to a third aspect of the present disclosure, a computer program product is proposed that has instructions that, when executed on an evaluation unit of a driver assistance system according to the present disclosure, prompt the driver assistance system to carry out the steps of a method according to the present disclosure. The computer program product may be configured from CD, DVD, Flash memory, Blu-Ray-Disc, RAM/ROM, Cache, or the like.

According to a fourth aspect of the present disclosure, a signal sequence is proposed that represents instructions that, when executed on an evaluation unit of a driver assistance system according to the disclosure, prompt the driver assistance system to carry out the steps of a method according to the disclosure. The signal sequence provides protection for the instructions even in the event of the data memories required for providing them being situated outside the scope of the attached claims.

According to a fifth aspect of the present disclosure, a vehicle (an automobile, transporter, truck, motorcycle, aircraft and/or watercraft) is proposed that has a driver assistance system according to the second aspect of the disclosure mentioned. Reference is also made to the explanations above with regard to the features, combinations of features and advantages of the vehicle according to the disclosure.

The augmented depiction of the POI according to the present disclosure directly in the surroundings of the vehicle facilitates the process of capture of the information included in the advice, since the clarification of the POI in the environment allows the driver to establish a direct reference to his position and route. According to one aspect, the present notification of disclosure describes the augmentation of POIs with a head up display whose field of view is situated at a projection distance of 7.50 m by 1.30 m width and is therefore limited to within the vehicle's own lane. Overlay of POIs at the side of the lane is therefore not possible. A concept of the present disclosure is therefore that of displaying the existence of a POI at the lateral lane edge by means of a representation in the lane and additionally of displaying a positioning of the POI in the environment. By way of example, a restaurant located on the road can be represented by a suitable symbol placed onto the lane in good time before an entrance to the restaurant is passed. Additions to the symbol are conceivable, with the name or further information, such as type of food and/or providers. Additionally, a positioning of this POI relative to the vehicle can be displayed. By way of example, a bar circulating during the journey (changing color) or an arrow can display the relative position of the POI. The POI is therefore continually visible to the driver as its position is actually approached. The beginning of the display can be chosen on the basis of speed, since at higher speeds the relevant road section is reached more quickly and therefore an earlier reaction by the user is required and, to this end, an earlier display is desirable.

BRIEF DESCRIPTIONS OF THE DRAWINGS

Exemplary embodiments of the present disclosure are described below with reference to the attached drawings, in which.

DETAILED DESCRIPTION

Figure 1:
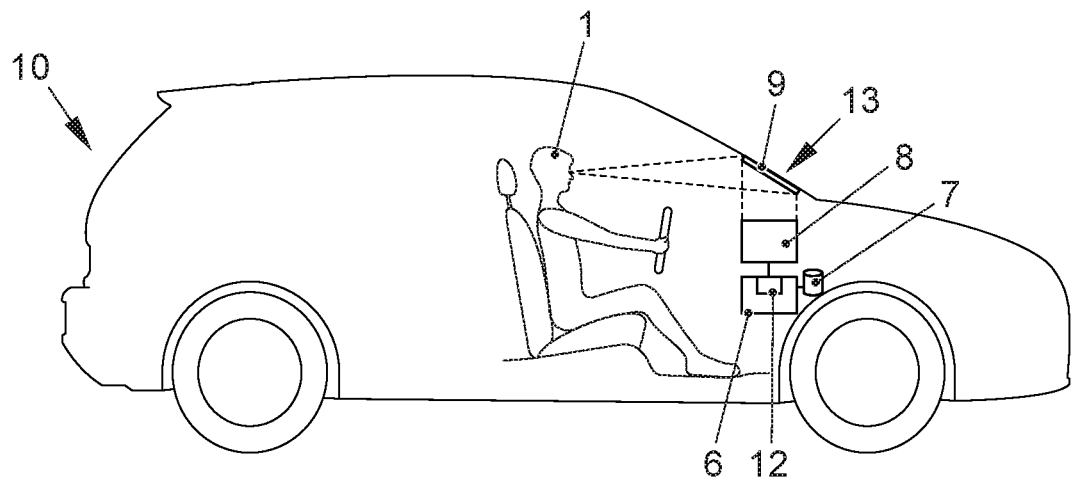
FIG. 1 shows a schematic depiction of an exemplary embodiment of a vehicle according to the present disclosure with an exemplary embodiment of a driver assistance system according to the present disclosure.

FIG. 1 shows an automobile 10 as a means of locomotion or vehicle in which a user 1 is provided with a head up display 13 to obtain information regarding the driving state of the vehicle, regarding navigation advice and information according to the present disclosure about points of interest. A data memory 7 includes instructions that enable an electronic controller 6, as an evaluation unit, to carry out a method according to the present disclosure. In addition, image files are included that can be used to display the advice according to the present disclosure, which advice is situated virtually in a plane of the road surface, by means of the head up display 13 (having a projector 8 and a semitransparent film 9). To this end, the electronic controller 6 is connected to the projector 8 via a data output 12 for information interchange purposes.

Figure 2:
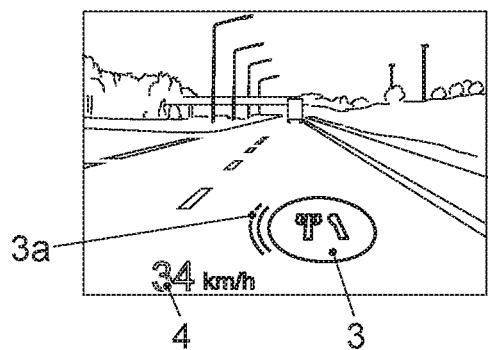
FIG. 2 shows a view of vehicle surroundings from the perspective of a driver, the view augmented according to teachings of the present disclosure.

FIG. 2 shows a perspective on surroundings of a vehicle, configured according to the present disclosure, that is approximately at the level of a POI (a restaurant). The advice 3 comprises an icon (knife and fork) surrounded by a circle, which represents restaurant services. Two circle segments 3a situated concentrically in relation to the common circle center of the advice 3 are arranged as pointers approximately at the 9 o'clock position of the advice 3 and indicate that the vehicle would need to turn left in order to drive to the POI. The current speed of travel of the vehicle (34 km/h) is indicated by advice 4, configured in a conventional manner, in the head up display of the vehicle.

Figure 3:
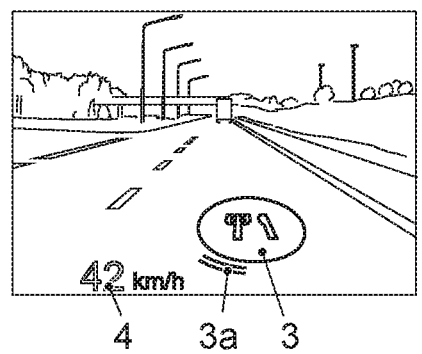
FIG. 3 shows a second view of vehicle surroundings from the perspective of a driver, the view augmented according to teachings of the present disclosure.

FIG. 3 shows the situation shown in FIG. 2 after the vehicle has passed a POI. The circle segments 3a as pointers have slid approximately to the half past seven position of the advice 3. The speed of travel of the vehicle has increased to 42 km per hour, this being depicted by advice 4, configured in a conventional manner, in the head up display.

Figure 4:
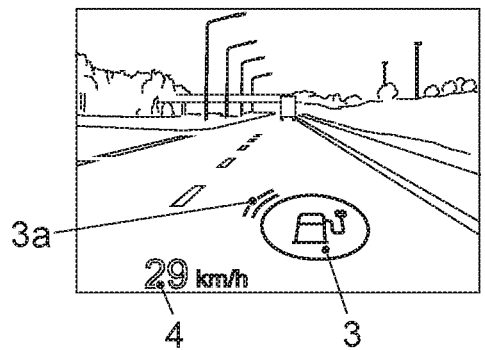
FIG. 4 shows a third view of vehicle surroundings from the perspective of a driver, the view augmented according to teachings of the present disclosure.
Figure 5:
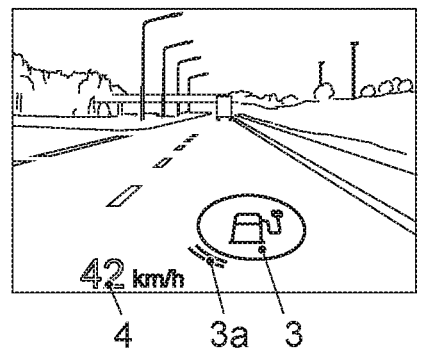
FIG. 5 shows a fourth view of vehicle surroundings from the perspective of a driver, the view augmented according to teachings of the present disclosure.

FIG. 4 shows a view of surroundings of a vehicle that are in proximity to an electrical charging station for electrically drivable vehicle as a POI. Accordingly, the advice 3 situated, according to the present disclosure, virtually in a plane of the road surface is formed by a gas pump symbol with an electrical charging plug and a circle surrounding the gas pump symbol. Approximately at the ten o'clock position, a circular arc segment 3a is arranged as a pointer in the direction of the electrical charging station. Since the charging station is still a very long way away, only one circular arc segment 3a is visible. The current speed of travel (29 km/h) of the vehicle is indicated by advice 4, configured in the conventional manner, in the head up display of the vehicle. FIG. 5 shows a view of vehicle surroundings that follows the driving situation depicted in FIG. 4 after the vehicle decreases a distance from the charging station, but has already passed it. Two circular arc segments 3a indicate the shorter distance from the charging station. Since they have slid to the half past seven position, however, the user is provided with the advice that he has already passed the charging station.

Figure 6:
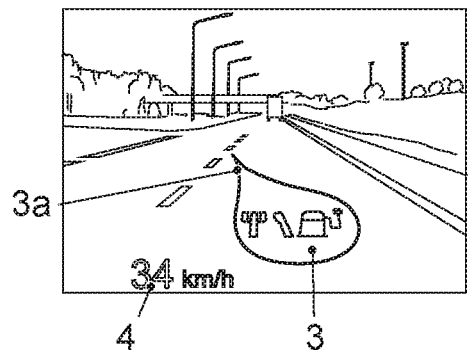
FIG. 6 shows a fifth view of vehicle surroundings from the perspective of a driver, the view augmented according to teachings of the present disclosure.

FIG. 6 shows a view of surroundings of a vehicle configured according to the present disclosure from the point of view of the driver, who has multiple POIs (a restaurant and an electrical charging station) arranged in proximity to him. As seen from the current geographical position of the vehicle, the two POIs are situated in a corresponding direction. Therefore, the icons (knife and fork, charging column) representing the two POIs have been combined in joint advice 3. A teardrop shape surrounds the two icons and the tapered portion of the teardrop shape points to the 10 o'clock position in which the restaurant and the charging station are situated.

Figure 7:
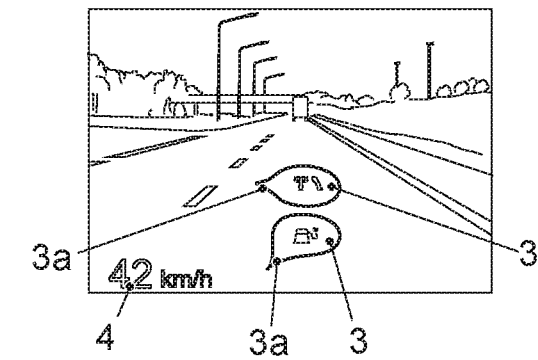
FIG. 7 shows a sixth view of vehicle surroundings from the perspective of a driver, the view augmented according to teachings of the present disclosure.

FIG. 7 shows the view depicted in FIG. 6 after the vehicle has moved to another geographical position with regard to the charging station and the restaurant. From the current position (situated closer and between the POIs), the POIs are situated in such different directions that combination, as in FIG. 6, does not allow sufficiently accurate reproduction of the directions. Accordingly, the advice 3 of the POIs is automatically split and respective teardrop shapes that surround the icons of the charging column and the restaurant point with their tapered regions 3a as pointers to the 9 o'clock position and the 7 o'clock position.

Figure 8:
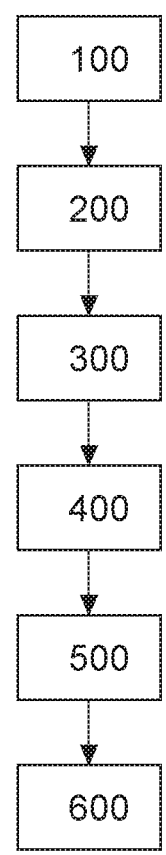
FIG. 8 shows a flowchart illustrating steps of an exemplary embodiment of a method according to the present disclosure for providing information to a user of a vehicle.

FIG. 8 shows steps of an exemplary embodiment of a method according to the present disclosure for providing information to a user of a vehicle. In step 100, a point of interest (POI) in proximity to the vehicle is ascertained. This is effected on the basis of map material in a local memory of the vehicle and on the basis of satellite-based position finding. In step 200, a current speed of travel of the vehicle is ascertained. On the basis of the speed of travel, advice of the position of the POI needs to be output right from when a greater distance from the POI is reached than at a lower speed of travel. Accordingly, in step 300, the advice is output to the user by means of a head up display of the vehicle on the basis of the speed of travel as advice, situated virtually in a plane of the road surface, of the proximity to the POI. In step 400, a pointer is displayed in the region of the advice and has its position on one of the advice-surrounding circles modified in step in order to provide information about a direction in which the POI is currently situated. In step 500, in response to the approach toward the POI, a tail of a teardrop shape that envelops the advice is extended. This occurs in accordance with a virtual attraction that is effective for the teardrop in the direction of the POI and increases at shorter distance. In step 600, finally, the tail of the teardrop has its color changed from blue to red in the course of an approach to the POI, in order to illustrate the immediate proximity to the POI.

LIST OF REFERENCE SYMBOLS

1 User
3 Advice
3a Pointer
4 Display
6 Electronic controller
7 Data memory
8 Projector
9 Semi-transparent film
10 Automobile
12 Data output
13 Head up display
100-600 Method steps

The invention claimed is:

1. A method for providing information to a user of a vehicle, the method comprising:
ascertaining a first point of interest and a proximity of the first point of interest to the user, wherein the ascertained first point of interest is of one of a plurality of categories of points of interest, the plurality of categories being selected by the user;
outputting advice, situated virtually in a plane of the road surface, of the proximity to the first point of interest to the user by means of a display device of the vehicle, wherein the advice graphically represents the first point of interest within an enclosed symbol;
ascertaining a second point of interest and a proximity of the second point of interest to the user, wherein the ascertained second point of interest is one of the plurality of categories; and
upon determining that the second point of interest is in a predefined proximity of the vehicle and situated in a matching direction relative to the vehicle, outputting the advice to include the second point of interest within the enclosed symbol.

2. The method according to claim 1, wherein the display device comprises a head up display.

3. The method according to claim 1, wherein the advice comprises an icon.

4. The method according to claim 1, further comprising:
ascertaining a current speed of travel of the vehicle; and
outputting the advice a distance or period of time, determined on the basis of the speed of travel, before the point of interest is reached.

5. The method according to claim 1, further comprising outputting a pointer in the region of the advice that indicates a direction in which the point of interest is situated.

6. The method according to claim 5, wherein the pointer is configured as a circular arc section arranged concentrically in relation to a center of the advice.

7. The method according to claim 5, further comprising changing a length of the pointer measured from a center of the advice on the basis of a distance of the vehicle from the point of interest.

8. The method according to claim 1, further comprising changing a color of the advice on the basis of a distance of the vehicle from the point of interest.

9. The method according to claim 1, further comprising ascertaining a multiplicity of points of interest and outputting joint advice of multiple points of interest if a predefined multiplicity of points of interest in predefined proximity to the vehicle has been reached and if the points of interest are situated in sufficiently matching directions relative to the vehicle.

10. A driver assistance system for providing information to a user of a vehicle, the system comprising:
a data input;
an evaluation unit; and
a data output, wherein
the evaluation unit is configured to:
use the data input to ascertain a first point of interest and a proximity of the first point of interest to the user, wherein the ascertained first point of interest is of one of a plurality of categories of points of interest, the plurality of categories being selected by the user; and
use the data output to output advice, situated virtually in a plane of the road surface, of the proximity to the first point of interest to the user by means of a display device of the vehicle, wherein the advice graphically represents the first point of interest within an enclosed symbol;
ascertain a second point of interest and a proximity of the second point of interest to the user, wherein the ascertained second point of interest is one of the plurality of categories; and
upon a determination that the second point of interest is in a predefined proximity of the vehicle and situated in a matching direction relative to the vehicle, output the advice to include the second point of interest within the enclosed symbol.

11. The system according to claim 10, wherein the system is configured to:
ascertain the point of interest and the proximity of the point of interest to the user; and
output the advice, situated virtually in a plane of the road surface, of the proximity to the point of interest to the user by means of a display device of the vehicle.

12. A computer program product comprising instructions that, when executed on a programmable processor of a driver assistance system, prompt the processor to perform:
ascertaining a first point of interest, and a proximity of the first point of interest to the user, wherein the ascertained first point of interest is of one of a plurality of categories of points of interest, the plurality of categories being selected by the user;
outputting advice, situated virtually in a plane of the road surface, of the proximity to the first point of interest to the user by means of a display device of the vehicle, wherein the advice graphically represents the first point of interest within an enclosed symbol;
ascertaining a second point of interest and a proximity of the second point of interest to the user, wherein the ascertained second point of interest is one of the plurality of categories; and
upon determination that the second point of interest is in a predefined proximity of the vehicle and situated in a matching direction relative to the vehicle, outputting the advice to include the second point of interest within the enclosed symbol.

13. The method according to claim 5, wherein the pointer points in the direction of the point of interest as a teardrop-shaped outline of a symbol of the advice.

14. The computer program product of claim 11, wherein the display device comprises a head up display.

15. The computer program product of claim 11, wherein the advice comprises an icon.

16. The computer program product of claim 11, wherein when the computer program product is executed on a programmable processor of the driver assistance system, the processor is further prompted to perform :
ascertaining a current speed of travel of the means of locomotion; and
outputting the advice a distance or period of time, determined on the basis of the speed of travel, before the point of interest is reached.

17. The computer program product of claim 11, wherein when the computer program product is executed on a programmable processor of the driver assistance system, the processor is further prompted to perform outputting a pointer in the region of the advice that indicates a direction in which the point of interest is situated.

18. The computer program product of claim 17, wherein the pointer is configured as a circular arc section arranged concentrically in relation to a center of the advice.

19. The method according to claim 1, wherein the vehicle is a transportation vehicle, wherein the user is a driver of the transportation vehicle, wherein the display device is a heads up display device of the transportation vehicle, wherein the ascertainment of the point of interest and the proximity of the point of interest to the user includes determining a location of the transportation vehicle relative to the point of interest, wherein the information provided to the driver is output as the advice on the heads up display and depicts the position of the location of the point of interest as a graphical element representing the point of interest, wherein the graphical element is positioned in the plane of the road surface relative to a current location of the transportation vehicle such that the location of the graphical element representing the point of interest changes on the heads up display based on a change of relative position between the point of interest and the transportation vehicle, and wherein a shape of the graphical element representing the point of interest also changes on the heads up display based on the change of the relative position between the point of interest and the transportation vehicle.

20. The system according to claim 10, wherein the vehicle is a transportation vehicle, wherein the user is a driver of the transportation vehicle, wherein the display device is a heads up display device of the transportation vehicle, wherein the ascertainment of the point of interest and the proximity of the point of interest to the user includes determining a location of the transportation vehicle relative to the point of interest, wherein the information provided to the driver is output as the advice on the heads up display and depicts the position of the location of the point of interest as a graphical element representing the point of interest, wherein the graphical element is positioned in the plane of the road surface relative to a current location of the transportation vehicle such that the location of the graphical element representing the point of interest changes on the heads up display based on a change of relative position between the point of interest and the transportation vehicle, and wherein the shape of the graphical element representing the point of interest also changes on the heads up display based on the change of the relative position between the point of interest and the transportation vehicle.

\* \* \* \* \*